Aug. 3, 1971  O. VINZ  3,597,182
METHOD OF MAKING SMALL GLASS CAPS HAVING
A NON-CIRCULAR CROSS SECTION
Filed Nov. 17, 1969
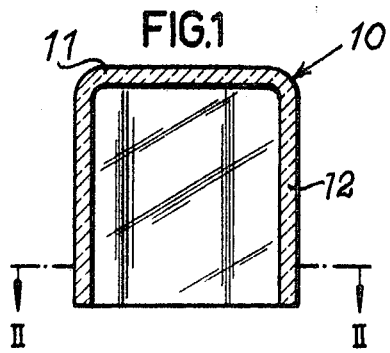
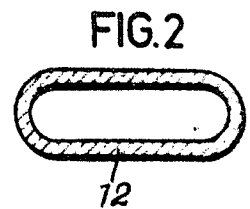
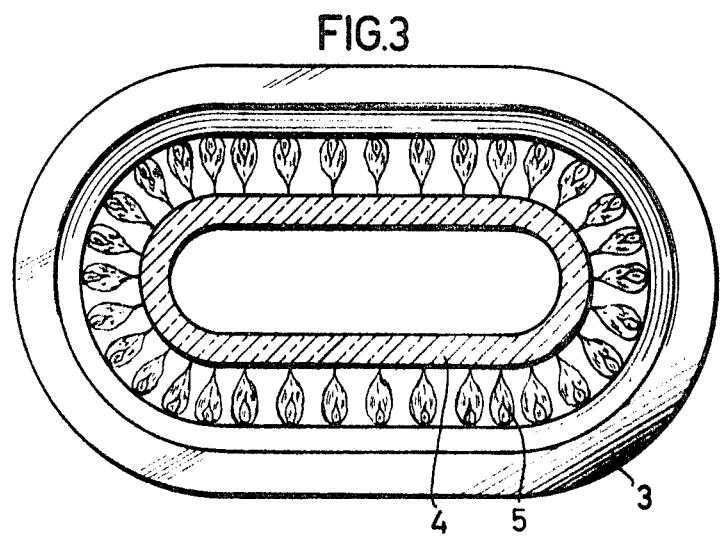
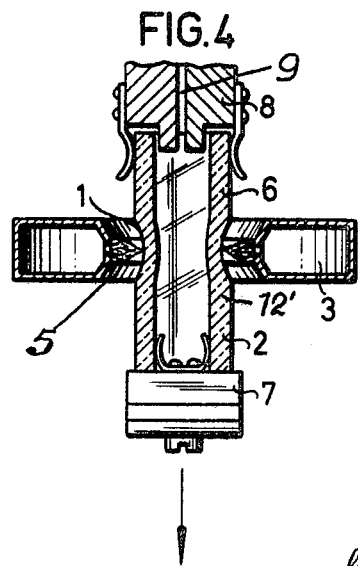
INVENTOR
Otmar Vinz
by Singer, Stern & Carlberg
Attorneys United States Patent Office 3,597,182
Patented Aug. 3, 1971

3,597,182
METHOD OF MAKING SMALL GLASS CAPS HAVING A NON-CIRCULAR CROSS SECTION
Otmar Vinz, Landshut, Germany, assignor to JENAer Glaswerk Schott & Gen., Mainz, Germany
Continuation-in-part of application Ser. No. 582,713, Sept. 28, 1966. This application Nov. 17, 1969, Ser. No. 877,527
Claims priority, application Germany, Oct. 28, 1965, J 29,273
Int. Cl. C03b *21/00*
U.S. Cl. 65—102
3 Claims

ABSTRACT OF THE DISCLOSURE

A method of producing glass caps of non-circular cross-section by first forming a glass tube of the desired non-circular cross-section and then heating a restricted peripheral zone of said glass tube, while the same is non-rotatably supported, by flames from a plurality of nozzles of a stationary burner substantially surrounding said glass tube at said peripheral zone, said nozzles being so dimensioned and so arranged to produce equal heating conditions along said entire non-circular peripheral zone, whereby upon removal of the lowermost superfluous material from the glass tube a bottom is formed on the cap.

The invention relates to a method of producing small glass caps having a non-circular cross-section and having a glass volume of not more than 1.00 cm.$^3$, for instance an oval or oblong cross-section, and constitutes a continuation in part of the patent application Ser. No. 582,713 filed on Sep. 28, 1966, and now abandoned.

Of late, it has become customary to produce in a manner similar to the production of electron tubes a glass envelope or jacket for enclosing electronic components for protection against harmful exterior influences. Owing to the shape of the structures and the desired to provide the same with a high packing compactness in circuit arrangements, it is quite common to use in place of circular envelopes flat, oval, oblong and even polygonal envelopes.

In order to make full use of the favorable properties of glass as an envelope, it is customary to provide such glass caps with glass sockets which carry suitable lead-in conductors which are fused thereto. Owing to the smallness of the parts and their sensitiveness to temperature, a particular fusion method is preferred which comprises a particularly careful treatment, namely a high-frequency induction heating. For this purpose, one provides the glass socket in the range where later on the fusion takes place with the cap with an embedded metallic ring, which is momentarily brought to a glowing condition and through heat conduction softens the lower edge of the cap and brings it to fusion before the entire arrangement and the structural element to be enveloped assume temperatures above the range where damage can occur.

Such a procedure requires, particularly in connection with mass production, a very accurate dimension of the cap and particularly a uniform wall thickness at the edge of the cap, so that during the momentary heating procedure the heat transmission and the fusion proceed simultaneously along the entire circumference of the cap. In addition, a very close tolerance of the height of the cap is necessary, since during the fusion procedure the cap by suitable tools is pressed upon the socket. Owing to the required temperature shock resistance of the completed structure, it is also desired that the bottom part of the cap has a uniform wall thickness throughout.

The making of non-axial symmetrical hollow bodies of glass is in itself accompanied by certain difficulties which in the present case are due to the required close dimensional tolerances and these difficulties are increased in that the completed caps have only a glass volume of, for instance, 0.02 to 1 cm.$^3$ and, therefore, are hardly able to store heat necessary for a subsequent shaping step. These difficulties in the heretofore employed methods of production are such that the completed glass caps have defects which develop principally during the subsequent working steps.

It is an object of the present invention to provide a method of making glass caps having a non-circular cross-section which is distinguished by the feature that the glass caps have a very uniform wall thickness throughout.

This particular method of the invention is distinguished by the fact that the making of the cap takes place in two timely separated method steps, in that firstly is produced a glass tube having a non-circular cross-section which corresponds to the non-circular cross-section of the cap and that secondly this glass tube is provided with a suitably shaped bottom to form the completed cap.

The production of a glass tube having the required non-circular cross-section can take place by any one of the well-known methods.

There are, however, required auxiliary means in order to provide this glass tube with a bottom having a definite form. The accompanying drawing is intended to illustrate the new method of the invention. The drawing illustrates by way of example the making of a glass housing for quartz oscillators which requires glass caps with a particularly flat or oblong cross-section.

In the drawing:
FIG. 1 illustrates a completed longitudinal section of a glass cap in accordance with the invention;
FIG. 2 is the cross-section along the line 2—2 of FIG. 1;
FIG. 3 illustrates a particular glass fusion burner; and
FIG. 4 illustrates an intermediate step during the fusion of the bottom.

Referring to the FIGS. 1 and 2, the same illustrate by way of example a specific form of a glass cap 10 made in accordance with the present invention and having a flat bottom 11 and a non-circular wall 12. When making this glass cap, a tube section 12' of a predetermined length and having an oblong cross-section as illustrated in FIG. 2 is provided by fusion with a bottom 11 in a manner as illustrated in FIG. 4. The tube section 12' which is open on both ends, is placed preferably in a vertical position, and thereupon a narrow circumferential zone 1 at the level where the bottom 11 is to be formed is heated until the ductility of the glass in the mentioned zone is sufficient, so that by a sudden removal of the excess lower part 2 of the tube section 12' the heated glass zone becomes constricted, and in view of the surface tension at this point of the glass a bottom is formed having in most instances a dome-shaped configuration. This particular method up to this point is known from processing circular tube sections but in accordance with the present invention a few modifications of this method are required in order to employ it also for non-circular tube sections so as to produce a bottom having the desired form. It is necessary, in the same manner as when treating a circular tube section, to produce a uniform circumferential heating of the tube section which is the case of a circular tube section may be done by rotating the latter in front of a flame, which automatically adjusts the heat so that owing to the heating along the entire circular circumference of the tube section, the removal of the excess portion of the tube can be accomplished uniformly in that at all points the same ductility of the glass is present. In accordance with the invention, this uniform distributed heating along the entire circumference of the non-circular tube section is accomplished by non-rotatably supporting the non-circular glass tube section in a vertical position and be employing a fixedly mounted gas burner which completely surrounds in a uniform spaced relation the non-circular tube section. The gas burner has at all its points a uniform distance from the glass tube section as this is shown in FIG. 3. This FIG. 3 illustrates a particular construction of a gas burner. For obtaining the desired uniform ductility of the glass, it is necessary that the burner nozzles along the inner oblong perimeter of the ring-shaped burner be arranged along this entire perimeter of the burner in such a manner that the burner nozzles have such a size and are arranged in such a distance from one another that the heat is distributed uniformly along the entire circumferential zone of the glass tube which is to be heated, so that at all points the heat application at any one time interval is uniform. According to FIG. 3, this is, for instance, accomplished in that the fixedly mounted burner 3 is provided with uniformly shaped nozzles 3a (FIG. 4) arranged at such a distance from one another that all of the flames 5 together will uniformly heat the peripheral surface zone 4 of the glass tube independently of its circumferential contour because the spacial distribution of all of the flames 5 produces a uniform heating. It should be noted that the distances between the nozzles—all of which have the same size—are so selected that the distances between the tips of the flames which contact the surface of the glass tube will be alike.

Concerning the form and distribution of the wall thickness of the bottom, the width of the peripheral heating zone is less important than the dynamic of the removal procedure. Since the material of the tube section, which later forms the cap, retains its position relative to the fixedly mounted burner 3 during the removal of the excess portion 2, there will be formed at the zone 1, which retains its position relative to the burner 3, a gradually restricted tube portion which at a predetermined time is fused and due to the surface tension of the glass is drawn upwardly toward the upper tube section to form the bottom. For the control of this point and for the control of the speed of the draw-off procedure, the present invention proposes to load the tube portion 2 to be removed with a weight 7, whose size may be made variable, whereby the size of this weight at a particular burner adjustment determines the amount of the glass available for forming the bottom.

In order to give the bottom of the cap a predetermined exterior contour, which in the described method of production, will in each case not be produced automatically, for instance, if the bottom shall have a specific flatness or constant radii of curvature where the bottom 11 merges into the circumferential wall 12, the invention provides that this freely formed bottom in its ductility condition is deformed in a mold to a predetermined shape by means of a pressure medium which is introduced into the cap of the tube supporting member 8 which for this purpose is provided with a passage 9. This particular step in the method of the present invention ensures in addition to a clean exterior contour also the maintenance of the initially mentioned close tolerances in the total height of the cap.

What I claim is:

1. A method of producing glass caps of non-circular cross-section and having a glass volume of not more than 1.00 cm.$^3$, comprising the successive steps of non-rotatably supporting a glass tube section having a non-circular cross-section in a vertical position by holding its upper end, heating a narrow peripheral zone between the ends of said glass tube section by means of flames issuing from a great many fixed nozzles of a stationary gas burner which surrounds said glass tube section at said peripheral zone at a uniform distance from the circumference of said glass tube section, said nozzles are all of the same size, being arranged at such a small distance from each other that an endless non-circular series of closely adjacent flames is formed in which the distances between the tips of the flames issuing from said nozzles and where these tips contact the surface of the glass tube will be equal, so as to ensure equal heating conditions along said peripheral zone of said non-circular glass tube section, said heating taking place until the ductility of the glass in said narrow non-circular peripheral zone is sufficient so that upon application of a subsequent downwardly directed force on the portion of the non-circular glass tube section below said narrow peripheral zone said lower portion is separated from the upper portion of said glass tube section, whereby the heated glass tube portion in said narrow peripheral zone becomes restricted and forms a wall which closes the lower end of the upper portion of said non-circular glass tube section.

2. The method as set forth in claim 1, in which said downwardly directed separation force is produced by the weight of said lower portion of said non-circular glass tube section, and varying said weight by applying variable loads to said lower portion of said glass tube section.

3. The method as set forth in claim 1, including the step of introducing into the cap, after the formation of said wall which closes the lower end of the upper portion of said non-circular glass tube section a pressure medium and urging it against a form for giving said wall a desired shape.

References Cited

UNITED STATES PATENTS

| 1,967,603 | 7/1934 | Zimber | 65—109X |
| 2,464,765 | 3/1949 | Palmer | 65—109X |
| 3,078,694 | 2/1963 | Schoenmakers et al. | 65—109 |

FOREIGN PATENTS

| 133,601 | 9/1901 | Germany. |
| 409,283 | 4/1934 | Great Britain. |

S. LEON BASHORE, Primary Examiner

J. H. HARMAN, Assistant Examiner

U.S. Cl. X.R.

65—105, 108, 110